US008832553B2

(12) United States Patent
Roberts et al.

(10) Patent No.: US 8,832,553 B2
(45) Date of Patent: Sep. 9, 2014

(54) PROGRAM GUIDE 3D ZOOM (75) Inventors: Brian Roberts, Frisco, TX (US); Heath Stallings, Grapevine, TX (US); Don Relyea, Dallas, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1325 days.

(21) Appl. No.: 11/764,998

(22) Filed: Jun. 19, 2007

(65) Prior Publication Data
US 2008/0320393 A1 Dec. 25, 2008

(51) Int. Cl.
*G06F 3/00* (2006.01)
*H04N 21/431* (2011.01)
*H04N 5/445* (2011.01)
*H04N 21/482* (2011.01)
*H04N 21/443* (2011.01)

(52) U.S. Cl.
CPC ....... *H04N 5/44543* (2013.01); *H04N 21/4312* (2013.01); *H04N 21/4821* (2013.01); *H04N 21/4438* (2013.01)
USPC ........................................... 715/716; 725/40

(58) Field of Classification Search
CPC . H04N 5/44543; H04N 21/482; H04N 21/84; H04N 21/4622; G06F 3/04815
USPC ................. 715/721, 757, 766, 782, 810, 848; 725/44
See application file for complete search history.

(56) References Cited

U.S. PATENT DOCUMENTS

| | | |
|---|---|---|
| 4,977,455 A | 12/1990 | Young |
| 5,151,789 A | 9/1992 | Young |
| 5,253,066 A | 10/1993 | Vogel |
| 5,307,173 A | 4/1994 | Yuen et al. |
| 5,335,079 A | 8/1994 | Yuen et al. |
| 5,353,121 A | 10/1994 | Young et al. |
| 5,382,983 A | 1/1995 | Kwoh et al. |
| 5,479,266 A | 12/1995 | Young et al. |
| 5,479,268 A | 12/1995 | Young et al. |
| 5,499,103 A | 3/1996 | Mankovitz |
| 5,512,963 A | 4/1996 | Mankovitz |
| 5,515,173 A | 5/1996 | Mankovitz et al. |
| 5,532,732 A | 7/1996 | Yuen et al. |
| 5,532,754 A | 7/1996 | Young et al. |
| 5,541,738 A | 7/1996 | Mankovitz |
| 5,550,576 A | 8/1996 | Klosterman |
| 5,553,123 A | 9/1996 | Chan et al. |
| 5,559,550 A | 9/1996 | Mankovitz |
| 5,600,711 A | 2/1997 | Yuen |
| 5,619,274 A | 4/1997 | Roop et al. |
| 5,640,484 A | 6/1997 | Mankovitz |
| 5,684,525 A | 11/1997 | Klosterman |
| 5,701,383 A | 12/1997 | Russo et al. |
| 5,706,145 A | 1/1998 | Hindman et al. |
| 5,727,060 A | 3/1998 | Young |
| 5,734,786 A | 3/1998 | Mankovitz |
| 5,790,198 A | 8/1998 | Roop et al. |
| 5,801,787 A | 9/1998 | Schein et al. |
| 5,808,608 A | 9/1998 | Young et al. |
| 5,809,204 A | 9/1998 | Young et al. |
| 5,812,205 A | 9/1998 | Milnes et al. |

(Continued)

*Primary Examiner* — Rashawn Tillery (57) ABSTRACT

Interactive program guide data is received and elements to be included in an interactive program guide are generated based at least in part on the interactive program guide data. Each of the elements is positioned in a graphical user interface with respect to each of an x-axis, a y-axis, and a z-axis.

18 Claims, 11 Drawing Sheets

(56) References Cited

U.S. PATENT DOCUMENTS

| | | | |
|---|---|---|---|
| 5,828,945 A | 10/1998 | Klosterman | |
| 5,870,150 A | 2/1999 | Yuen | |
| 5,886,746 A | 3/1999 | Yuen et al. | |
| 5,915,026 A | 6/1999 | Mankovitz | |
| 5,923,362 A | 7/1999 | Klosterman | |
| 5,940,073 A | 8/1999 | Klosterman et al. | |
| 5,949,954 A | 9/1999 | Young et al. | |
| 5,959,688 A | 9/1999 | Schein et al. | |
| 5,969,748 A | 10/1999 | Casement et al. | |
| 5,970,206 A | 10/1999 | Yuen et al. | |
| 5,974,222 A | 10/1999 | Yuen et al. | |
| 5,987,213 A | 11/1999 | Mankovitz et al. | |
| 5,988,078 A | 11/1999 | Levine | |
| 5,991,498 A | 11/1999 | Young | |
| 6,002,394 A | 12/1999 | Schein et al. | |
| 6,016,141 A | 1/2000 | Knudson et al. | |
| 6,025,837 A * | 2/2000 | Matthews et al. | 715/721 |
| 6,028,599 A | 2/2000 | Yuen et al. | |
| 6,049,652 A | 4/2000 | Yuen et al. | |
| 6,052,145 A | 4/2000 | Macrae et al. | |
| 6,072,983 A | 6/2000 | Klosterman | |
| 6,075,551 A | 6/2000 | Berezowski et al. | |
| 6,075,575 A | 6/2000 | Schein et al. | |
| 6,078,348 A | 6/2000 | Klosterman et al. | |
| 6,091,882 A | 7/2000 | Yuen et al. | |
| 6,118,492 A | 9/2000 | Milnes et al. | |
| 6,133,909 A | 10/2000 | Schein et al. | |
| 6,137,950 A | 10/2000 | Yuen | |
| 6,144,401 A | 11/2000 | Casement et al. | |
| 6,151,059 A | 11/2000 | Schein et al. | |
| 6,167,188 A | 12/2000 | Young et al. | |
| 6,177,931 B1 | 1/2001 | Alexander et al. | |
| 6,216,265 B1 | 4/2001 | Roop et al. | |
| 6,239,794 B1 | 5/2001 | Yuen et al. | |
| 6,247,176 B1 | 6/2001 | Schein et al. | |
| 6,262,722 B1 | 7/2001 | Allison et al. | |
| 6,263,501 B1 | 7/2001 | Schein et al. | |
| 6,323,911 B1 | 11/2001 | Schein et al. | |
| 6,341,195 B1 | 1/2002 | Mankovitz et al. | |
| 6,341,374 B2 | 1/2002 | Schein et al. | |
| 6,388,714 B1 | 5/2002 | Schein et al. | |
| 6,396,546 B1 | 5/2002 | Alten et al. | |
| 6,412,110 B1 | 6/2002 | Schein et al. | |
| 6,430,358 B1 | 8/2002 | Yuen et al. | |
| 6,430,359 B1 | 8/2002 | Yuen et al. | |
| 6,453,471 B1 | 9/2002 | Klosterman | |
| 6,460,181 B1 | 10/2002 | Donnelly | |
| 6,466,734 B2 | 10/2002 | Yuen et al. | |
| 6,469,753 B1 | 10/2002 | Klosterman et al. | |
| 6,477,705 B1 | 11/2002 | Yuen et al. | |
| 6,498,895 B2 | 12/2002 | Young et al. | |
| 6,505,348 B1 | 1/2003 | Knowles et al. | |
| 6,538,701 B1 | 3/2003 | Yuen | |
| 6,549,719 B2 | 4/2003 | Mankovitz | |
| 6,564,379 B1 | 5/2003 | Knudson et al. | |
| 6,567,606 B2 | 5/2003 | Milnes et al. | |
| 6,577,350 B1 * | 6/2003 | Proehl et al. | 348/564 |
| 6,588,013 B1 | 7/2003 | Lumley et al. | |
| 6,668,133 B2 | 12/2003 | Yuen et al. | |
| 6,687,906 B1 | 2/2004 | Yuen et al. | |
| 6,732,369 B1 | 5/2004 | Schein et al. | |
| 6,742,183 B1 | 5/2004 | Reynolds et al. | |
| 6,745,391 B1 | 6/2004 | Macrae et al. | |
| 6,756,997 B1 | 6/2004 | Ward et al. | |
| 6,760,537 B2 | 7/2004 | Mankovitz | |
| 6,799,326 B2 | 9/2004 | Boylan et al. | |
| 6,799,327 B1 | 9/2004 | Reynolds et al. | |
| 6,850,693 B2 | 2/2005 | Young et al. | |
| 6,857,128 B1 * | 2/2005 | Borden et al. | 725/39 |
| 6,859,799 B1 | 2/2005 | Yuen | |
| 7,039,935 B2 | 5/2006 | Knudson et al. | |
| 7,069,576 B1 | 6/2006 | Knudson et al. | |
| 7,487,529 B1 | 2/2009 | Orlick | |
| 7,574,656 B2 * | 8/2009 | Billmaier et al. | 715/720 |
| 7,581,182 B1 * | 8/2009 | Herz | 715/713 |
| 2001/0029610 A1 | 10/2001 | Corvin et al. | |
| 2001/0047298 A1 | 11/2001 | Moore et al. | |
| 2001/0054181 A1 | 12/2001 | Corvin | |
| 2002/0073424 A1 | 6/2002 | Ward et al. | |
| 2002/0124255 A1 | 9/2002 | Reichardt et al. | |
| 2003/0005445 A1 | 1/2003 | Schein et al. | |
| 2003/0011636 A1 * | 1/2003 | Feroglia et al. | 345/767 |
| 2003/0056219 A1 | 3/2003 | Reichardt et al. | |
| 2003/0084445 A1 * | 5/2003 | Pilat | 725/44 |
| 2003/0110495 A1 | 6/2003 | Bennington et al. | |
| 2003/0110499 A1 | 6/2003 | Knudson et al. | |
| 2003/0115599 A1 | 6/2003 | Bennington et al. | |
| 2003/0115602 A1 | 6/2003 | Knee et al. | |
| 2003/0163813 A1 | 8/2003 | Klosterman et al. | |
| 2003/0164858 A1 | 9/2003 | Klosterman et al. | |
| 2003/0167466 A1 * | 9/2003 | Nakamura et al. | 725/39 |
| 2003/0188310 A1 | 10/2003 | Klosterman et al. | |
| 2003/0188311 A1 | 10/2003 | Yuen et al. | |
| 2003/0196201 A1 | 10/2003 | Schein et al. | |
| 2003/0204847 A1 | 10/2003 | Ellis et al. | |
| 2003/0208756 A1 | 11/2003 | Macrae et al. | |
| 2004/0010806 A1 | 1/2004 | Yuen et al. | |
| 2004/0017388 A1 * | 1/2004 | Stautner et al. | 345/716 |
| 2004/0045025 A1 | 3/2004 | Ward et al. | |
| 2004/0107437 A1 | 6/2004 | Reichardt et al. | |
| 2004/0168189 A1 | 8/2004 | Reynolds et al. | |
| 2004/0194138 A1 | 9/2004 | Boylan et al. | |
| 2004/0223731 A1 * | 11/2004 | Ozawa et al. | 386/46 |
| 2004/0261098 A1 | 12/2004 | Macrae et al. | |
| 2005/0010949 A1 | 1/2005 | Ward et al. | |
| 2005/0028201 A1 | 2/2005 | Klosterman et al. | |
| 2005/0097603 A1 * | 5/2005 | Kikinis | 725/44 |
| 2005/0125823 A1 | 6/2005 | McCoy et al. | |
| 2005/0149964 A1 | 7/2005 | Thomas et al. | |
| 2005/0155056 A1 | 7/2005 | Knee et al. | |
| 2005/0216936 A1 | 9/2005 | Knudson et al. | |
| 2005/0251824 A1 | 11/2005 | Thomas et al. | |
| 2006/0156336 A1 | 7/2006 | Knudson et al. | |
| 2006/0212894 A1 | 9/2006 | Knudson et al. | |
| 2006/0277574 A1 | 12/2006 | Schein et al. | |
| 2006/0288366 A1 | 12/2006 | Boylan et al. | |
| 2007/0016926 A1 | 1/2007 | Ward et al. | |
| 2007/0033613 A1 | 2/2007 | Ward et al. | |
| 2007/0107010 A1 | 5/2007 | Jolna et al. | |

* cited by examiner

PROGRAM GUIDE 3D ZOOM

BACKGROUND INFORMATION

An interactive program guide (IPG) or the like may be rendered in a graphical user interface (GUI) through a content processing device such as a set top box (STB). An IPG generally provides a user of a content processing device with a listing of available media programming through a media player connected to the content processing device, such as a television or the like. For example, an IPG may have a list of programming channels along a vertical axis, and a list of programming times along a horizontal axis. Cells in the IPG associated with particular channels and particular times may be used to list available media programming for a user. By using a remote control device or the like, a user may scroll along the horizontal and vertical axes to view program listings associated with times and channels of interest.

However, scrolling operations presently available to IPG users are limited. In general, only two axes for scrolling, a horizontal axis and a vertical axis, are available. Further, present mechanisms for allowing a user to access detailed information concerning a program listing may be awkward. A user viewing a program title may wish to obtain additional information about a program, such as a synopsis, a listing of actors, etc. Unfortunately, graphical user interfaces that currently include IPGs often lack intuitive and user-friendly mechanisms for accessing detailed programming information.

DETAILED DESCRIPTION OF THE PREFERRED EMBODIMENTS

Figure 1:
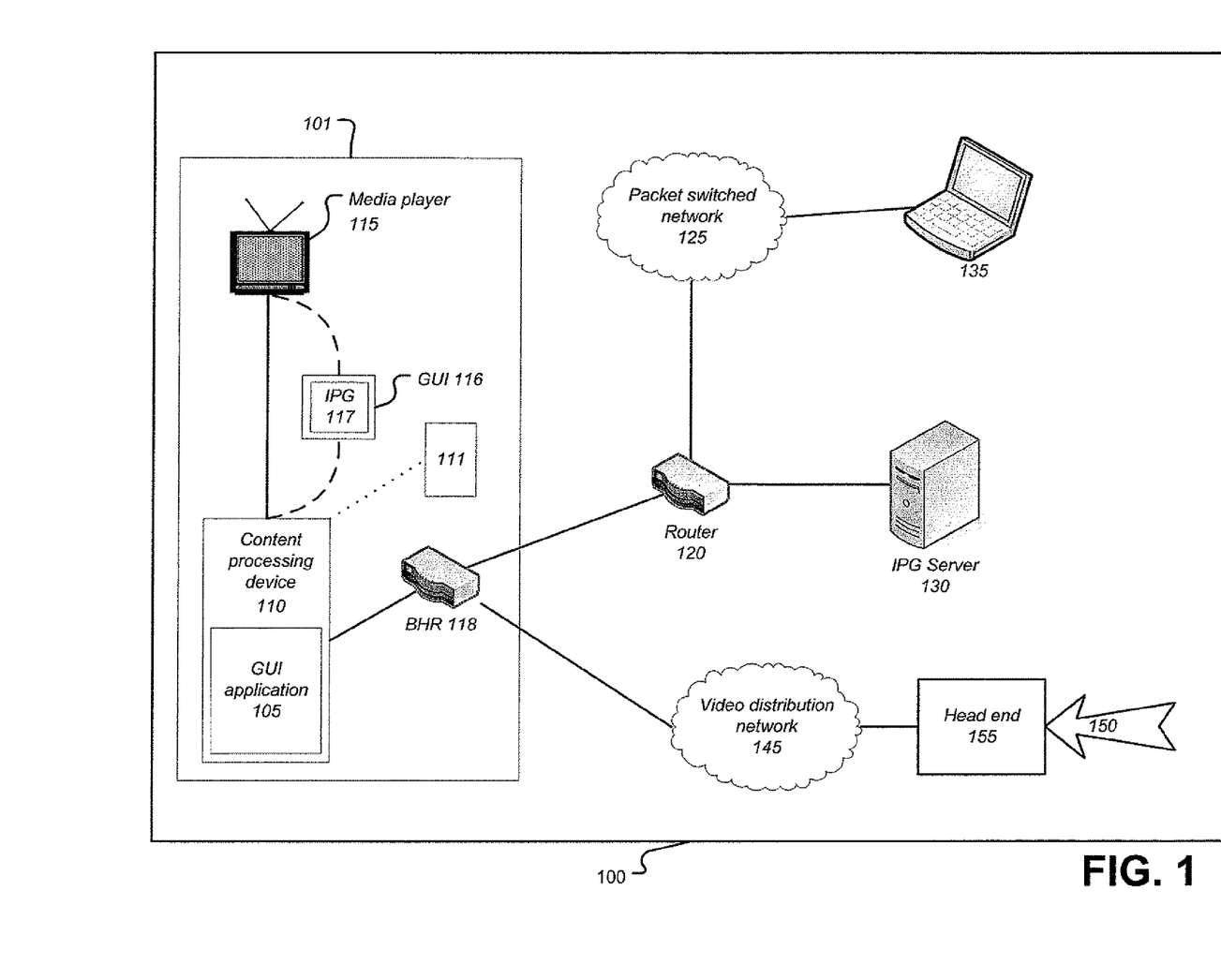
FIG. 1 illustrates an exemplary system for rendering and displaying, in a graphical user interface, an interactive program guide.

FIG. 1 illustrates an exemplary system 100 for rendering and displaying, in a graphical user interface (GUI) 116, an interactive program guide (IPG) 117. A GUI application 105 included in a content processing device 110 receives IPG data from an IPG server 130, and renders such data into GUI 116 as IPG 117 for display in a media player 115, e.g., a television. A user may access IPG 117 through a remote control or the like that is in selective communication with content processing device 110. Content processing device 110, control 111, media player 115, and a broadband home router (BHR) 118 are generally located within a customer premises 101. Content processing device 110 selectively communicates with IPG server 130, e.g., through broadband home router (BHR) 118 and a gateway router 120. Further, gateway router 120 provides access to a packet-switched network 125, which in turn may provide access to one or more computers 135. A media distribution network 145 may be combined with or included in packet-switched network 125, although the network 145 is illustrated separately in FIG. 1. A media signal 150, e.g., a video signal, is provided to video distribution network 145 through a head end 155. Some or all of media signal 150 received in content processing device 110 may be accessed by a user through media player 115.

Content processing device 110 may be a set top box (STB) or similar device known for receiving a media signal from a network and for providing media programming, e.g., audio, video, etc., to a media player 115. Content processing device 110 may be controlled by a user through a control 111, thereby facilitating the selection and playing of content through media player 115. But one example, from many possible examples, of content processing device 110 is set top box model DCT6416 made by Motorola, Inc. of Schaumburg, Ill.

Control 111 is generally a remote control known for selectively communicating with content processing device 110 through wireless communications, such as infrared (IR) communications. Control 111 generally includes numeric keys for selecting channels of video programming, as well as other keys for making selections and requests according to menus displayed on playback media player 115, in addition to arrow keys and the like for selecting channels and items in a menu, changing volume levels, etc. Control 111 is further discussed below with reference to FIG. 2.

Media player 115 may include a variety of known equipment alone or in combination, such as a video receiver, including a conventional television or a hi-definition television (HDTV), audio equipment including an amplifier and speakers, or devices that incorporate the capability to simultaneously process both video and audio data, etc. Media player 115 may be connected to, and receive multimedia content from, content processing device 110 in a known manner.

A gateway router 120 allows content processing device 110 to access packet switched network 125. By communicating with router 120, content processing device 110 is able to obtain a network address such as an internet protocol (IP) address. Content processing device 110 may use such an address to make requests to, and to receive data from, IPG server 130.

Packet switched network 125 is generally an internet protocol (IP) network. As such, network 125 generally uses one or more known protocols for transporting data, such as user datagram protocol (UDP), transport control protocol (TCP), hypertext transfer protocol (HTTP), etc. Further, network 125 may include a variety of networks such as a wide area network (WAN), e.g., the Internet, a local area network (LAN), etc. As is known, packet switched network 125 may be used to transport a variety of data, including multimedia data such as audio data and video data.

Media distribution network 145 may include hardware and software for providing media signal 155 via coaxial cable and/or fiber optic cable. In the illustrated embodiment, fiber optic cable is used to provide both data and media signal 155 to customer premises 101, including to content processing device 110. As is known, an optical line terminal (OLT) may serve as a terminus for an optical network or an optical line. An OLT may accordingly provide data, including video signal 155, to one or more optical network terminals (ONTs). An ONT is generally situated adjacent to a customer premise 180, for the purpose of providing data received over an optical line to the customer premise 180, including content processing device 110. Accordingly, FIG. 1 illustrates a hybrid network system in which media signal 155, transported over media distribution network 145, and also data transported over packet switched network 125, are received in customer premises 101 through a fiber optic line. However, it should be understood that embodiments are possible in which content processing device 110 receives both data and audio/video communications via media other than fiber optic cables to customer premises 101.

Further, because packet-switched network 125 may be used to transport multimedia data, it is to be understood that embodiments are possible in which networks 125 and 145 are in fact combined into a single network, or in which media distribution network 140 is simply omitted, wherein packet switched network 125 is used to provide media signal 155 to video hub office 140.

Computing devices such as content processing device 110, IPG server 130, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of known computing devices, including, without limitation, a computer workstation, a desktop, notebook, laptop, or handheld computer, or some other known computing device.

Content processing device 110 generally is a specialized device for receiving video signals 155 from head end 155 via network 145, as discussed above, and may be provided with a proprietary or specialized operating system other than those enumerated above. For example, in one embodiment, content processing device 110 is an STB provided with a real time operating system (RTOS) such as is known. However, it is to be understood that content processing device 110 may be a computing device such as one of those enumerated above, so long as the computing device is capable of receiving media signals 155 from network 145, and also is capable of providing GUI 116, including IPG 117, for display on the media player 115, and sending and receiving communications to and from IPG server 130. Although not reflected in FIG. 1, content processing device 110 and IPG server 130 may communicate through packet switched network 125. However, content processing device 110 and IPG server 130 may also conduct packet communications through one or more routers or other switching devices, e.g., routers 118 and 120, connected by fiber optic cable, coaxial cable, wires, etc.

Computing devices generally each include instructions executable by one or more computing devices such as those listed above. Computer-executable instructions may be compiled or interpreted from computer programs created using a variety of known programming languages and/or technologies, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media. GUI application 105, for example, includes computer-executable instructions for rendering GUI 116.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Databases or data stores described herein may include various kinds of mechanisms for storing, accessing, and retrieving various kinds of data, including a hierarchical database, a set of files in a file system, an application database in a proprietary format, a relational database management system (RDBMS), etc. Each such database or data store is generally included within a computing device employing a computer operating system such as one of those mentioned above, and are accessed via a network in any one or more of a variety of manners, as is known. A file system may be accessible from a computer operating system, and may include files stored in various formats. An RDBMS generally employs the known Structured Query Language (SQL) in addition to a language for creating, storing, editing, and executing stored procedures, such as the PL/SQL language mentioned above.

Figure 2:
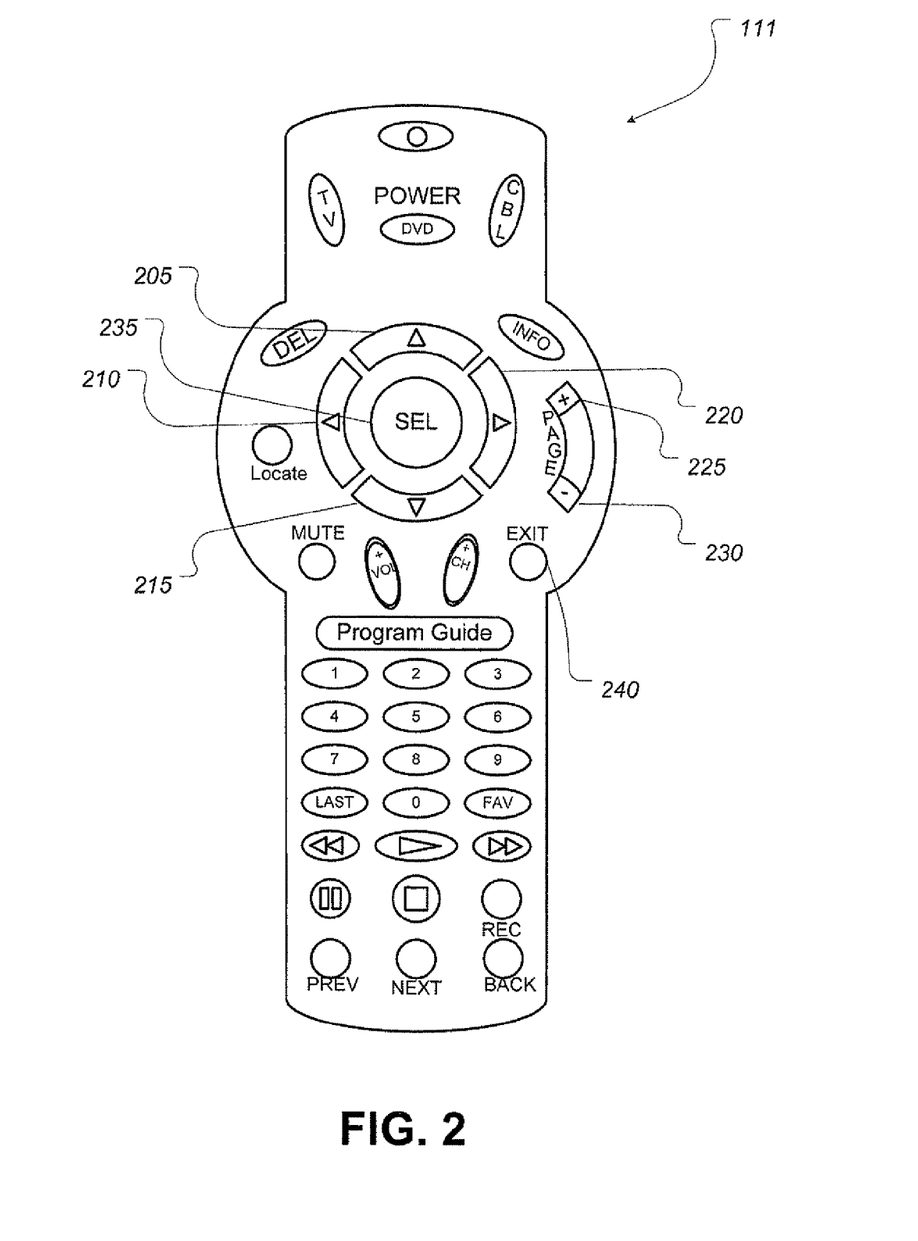
FIG. 2 illustrates an exemplary user control.

FIG. 2 illustrates an exemplary control 111. Control 111 may include a plurality of navigation keys, such as arrow keys 205, 210, 215, and 220, and a "select" key 235. Control 11 may additionally or alternatively include any of a number of mechanisms for providing input such as scroll wheels, dials, joysticks, stroke pads, pointers, etc. that can be used to navigate, to indicate a desired position on a graphical user interface, or to indicate an intended selection. The user input device 125 may further include functional keys, such as page up key 225 and page down key 230, as well as exit key 240.

Page keys 225 and 230 may provide a user with scrolling operations beyond arrow keys 205, 210, 215, and 220. Exit key 240 may allow a user to exit a screen or application being accessed, e.g., GUI 116.

Figure 3:
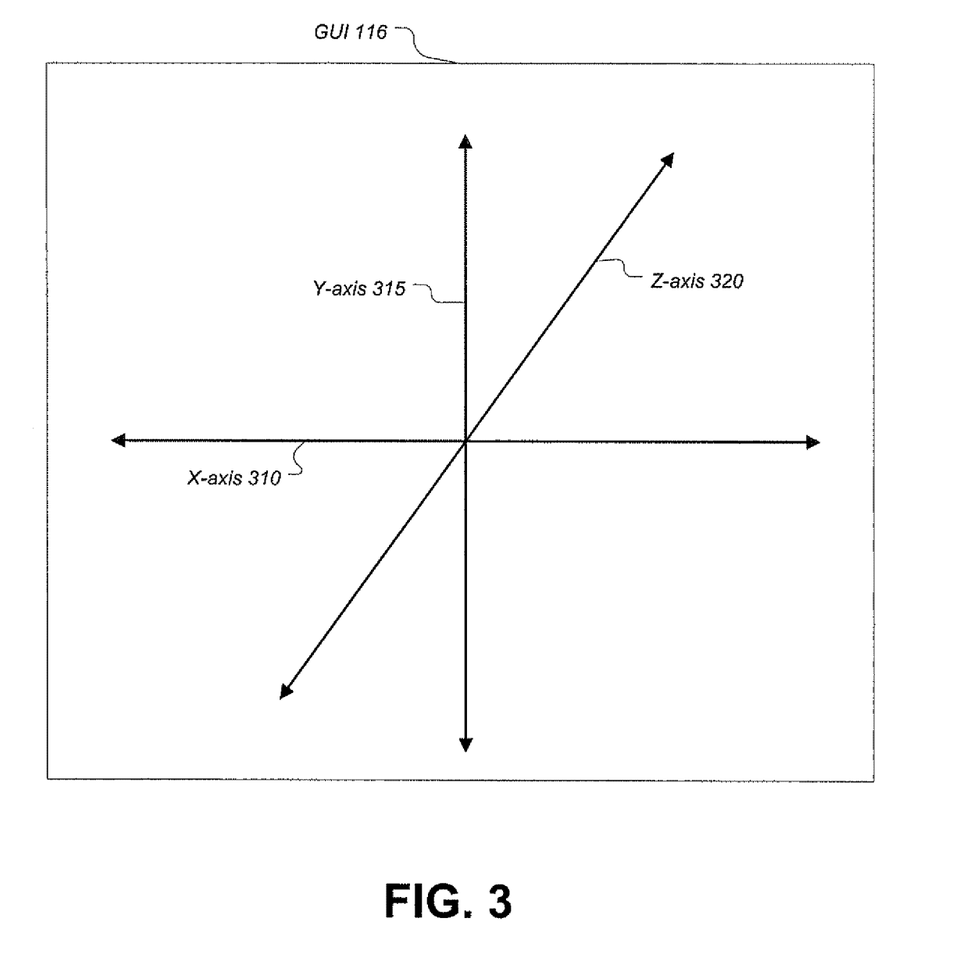
FIG. 3 provides an exemplary abstract illustration of a graphical user interface.

FIG. 3 provides an exemplary abstract illustration of GUI 116. As discussed further below, GUI 116 is used to render IPG 117 in three dimensions. Accordingly, GUI 116 includes an x-axis 310, a y-axis 315, and a z-axis 320. Axes 310, 315, and 320 provide a frame of reference for scrolling and zooming operations described herein. However, it is to be understood that other frames of reference may be possible.

Figure 4:
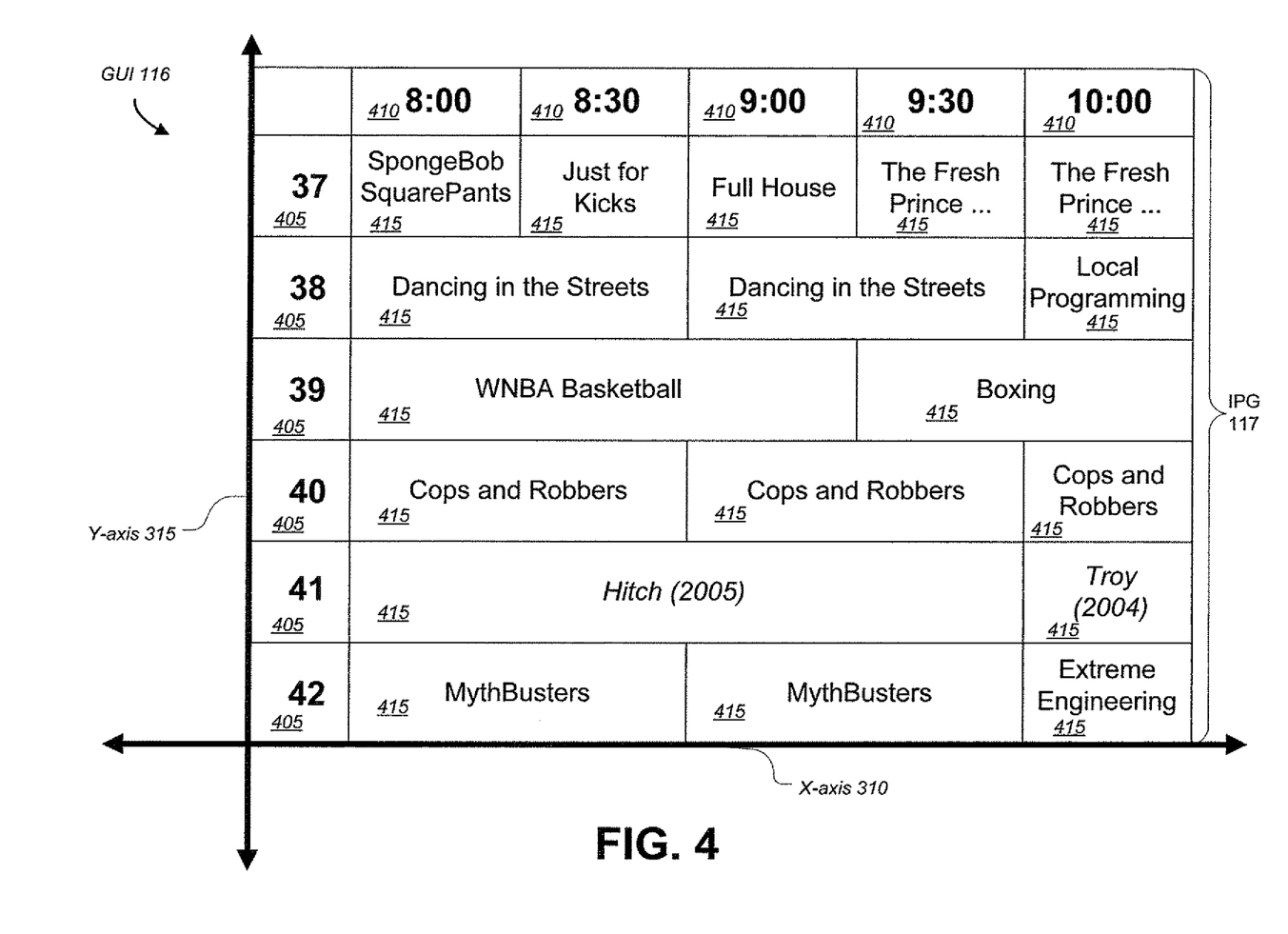
FIG. 4 illustrates an exemplary graphical user interface including an exemplary interactive program guide that may be scrolled in two dimensions.

FIG. 4 illustrates an exemplary GUI 116 including an exemplary IPG 117 that may be scrolled in two dimensions. Specifically, the IPG 117 of FIG. 4 may be scrolled vertically, i.e., in a direction indicated by a y-axis 315, or may be scrolled horizontally, e.g., in a direction indicated by x-axis 310. As seen in FIG. 4, IPG 117 includes channel cells 405, time cells 410, and program information cells 415. Channel cells 405 include information concerning a channel in media signal 150 available for user access. For example, as seen in FIG. 4, Channel cells 405 include a channel number indicating a channel of video programming available to a user. Time cells 410 indicate periods or blocks of time in which media programming occurs. Program information cells 415 include information concerning media programs available on channels and at times indicated by Channel cells 405 and time cells 410. For example, as shown in FIG. 4, program information cells 415 include the titles of media programs that may be played through content processing device 110 and media player 115.

Figure 5:
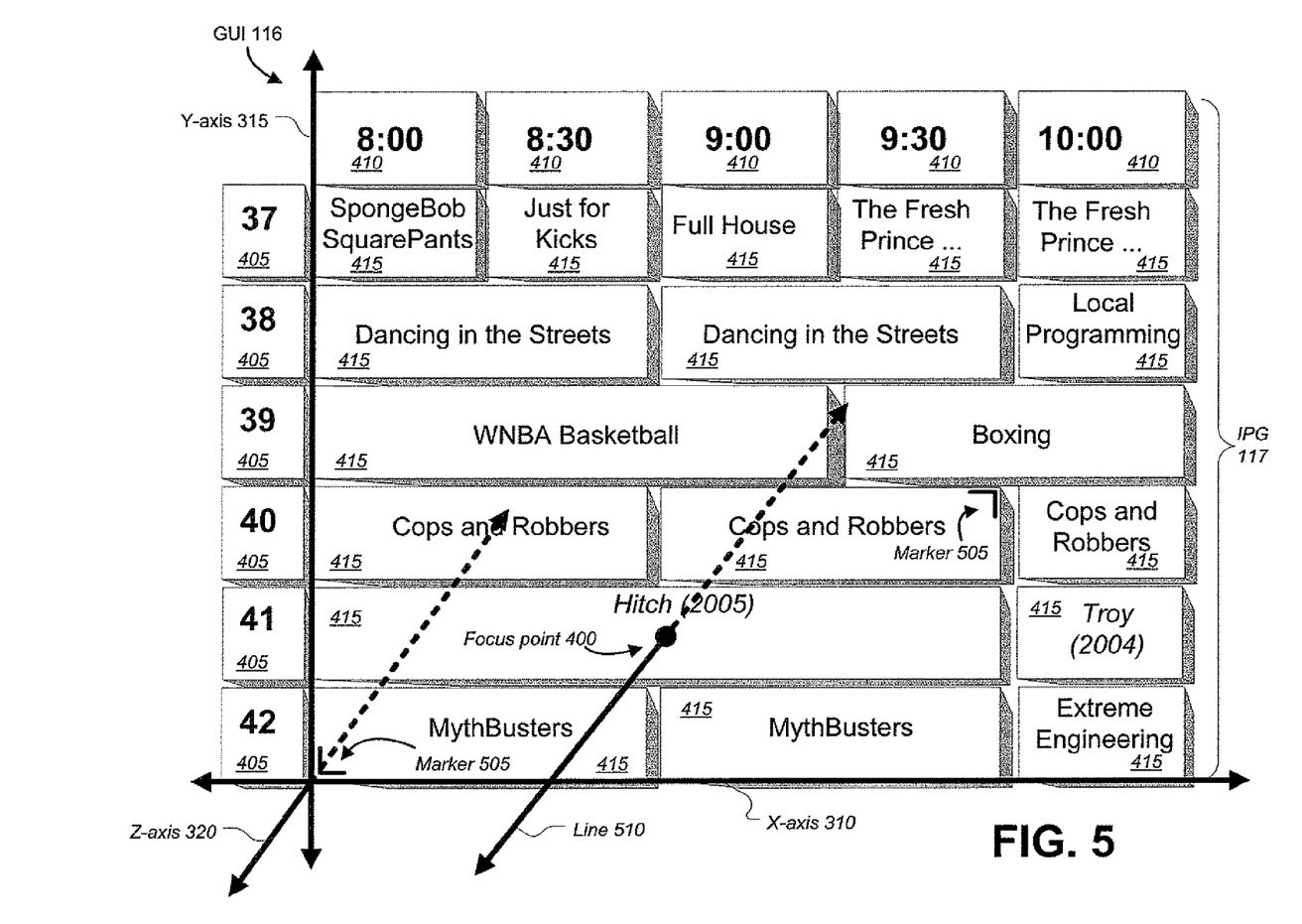
FIG. 5 illustrates an exemplary graphical user interface including an exemplary interactive program guide that may be scrolled in three dimensions.

FIG. 5 illustrates an exemplary GUI 116 including an exemplary IPG 117 that may be scrolled in three dimensions. Specifically, the IPG 117 of FIG. 5 may be scrolled vertically, i.e., in a direction indicated by a y-axis 315, horizontally, e.g., in a direction indicated by x-axis 310, or in a direction that appears to be toward or away from a user viewing media player 115, e.g., in a direction indicated by z-axis 320. As with the IPG 117 of FIG. 4, the IPG 117 of FIG. 5 includes channel cells 405, time cells 410, and program information cells 415. Moreover, these IPG elements 405, 410, and 415 are illustrated in FIG. 5 as having a three-dimensional aspect to reflect the fact that the elements 405, 410, and 415 may be accessed by a user in three dimensions, i.e., the three dimensions indicated by axes 310, 315, and 320.

The IPG 117 of FIG. 5 also includes a focus point 500 and markers 505. Focus point 500 represents a central point of focus of whatever portion of IPG 117 is being displayed within GUI 116. Markers 505 may be used to identify a portion of IPG 117 that may be the object of a scroll operation that occurs along z-axis 320, e.g., a "zoom in" operation as described below.

Focus point 500 is generally located within GUI 116 with reference to a program information cell 415 on a plane defined by x-axis 310 and y-axis 315. It is to be understood that the plane defined by x-axis 310 and y-axis 315 represents a visual plane on which GUI 116 is displayed and which is viewed by a user. Focus point 500 may not be visually displayed within GUI 116, but may simply represent a logical concept. That is, focus point 500 may be maintained by GUI application 105 within a memory of content processing device 110 as an abstract data point, e.g., a set of coordinates in GUI 116 with reference to axes 310, 320, and 315. Of course, assuming that focus point 500 lies on the plane defined by x-axis 310 and y-axis 315, the z-coordinate of focus point 500 will always be zero.

In general, focus point 500 represents a user perspective of GUI 116 as if a line were drawn from focus point 500 to the user. Further, focus point 500 generally is included on a line 510 that is parallel to z-axis 320 and perpendicular to each of x-axis 310 and y-axis 315. When a user provides input to scroll IPG 117 in a direction defined by z-axis 320, line 510 defines a path for narrowing or expanding the focus of GUI 116 on IPG 117. The user may be represented as on the line 510, although the user may be represented as if on a different line that is parallel to z-axis 320 but not necessarily perpendicular to each of x-axis 310 and y-axis 315.

In any event, if a user selects to narrow the focus of GUI 116 on IPG 117, i.e., a user selects to "zoom in," GUI application 105 will cause GUI 116 to display a selected portion of IPG 117, e.g., as indicated by markers 405, generally in more detail and occupying a larger area of GUI 116 than previously. Similarly, if a user selects to expand the focus of GUI 116 on IPG 117, i.e., a user selects to "zoom out," GUI application 105 will cause GUI 116 to display the presently displayed portion of IPG 117 generally in less detail and occupying a smaller area of GUI 116 than previously. Further, a zoom in operation will generally result in a smaller portion of IPG 117 being displayed that was displayed previously, while a zoom out operation will generally result in a larger portion of IPG 117 being displayed that was displayed previously.

The locations of focus point 500 in GUI 116 and/or markers 505 are generally determined according to program instructions included in GUI application 105. Further, the locations of focus point 500 and/or markers 505 may be determined at least in part according to input from a user, e.g., input received through control 111. For example, one or more inputs from arrow keys 205-220 may be used in determining the location of focus point 500 and/or markers 505.

Figure 6:
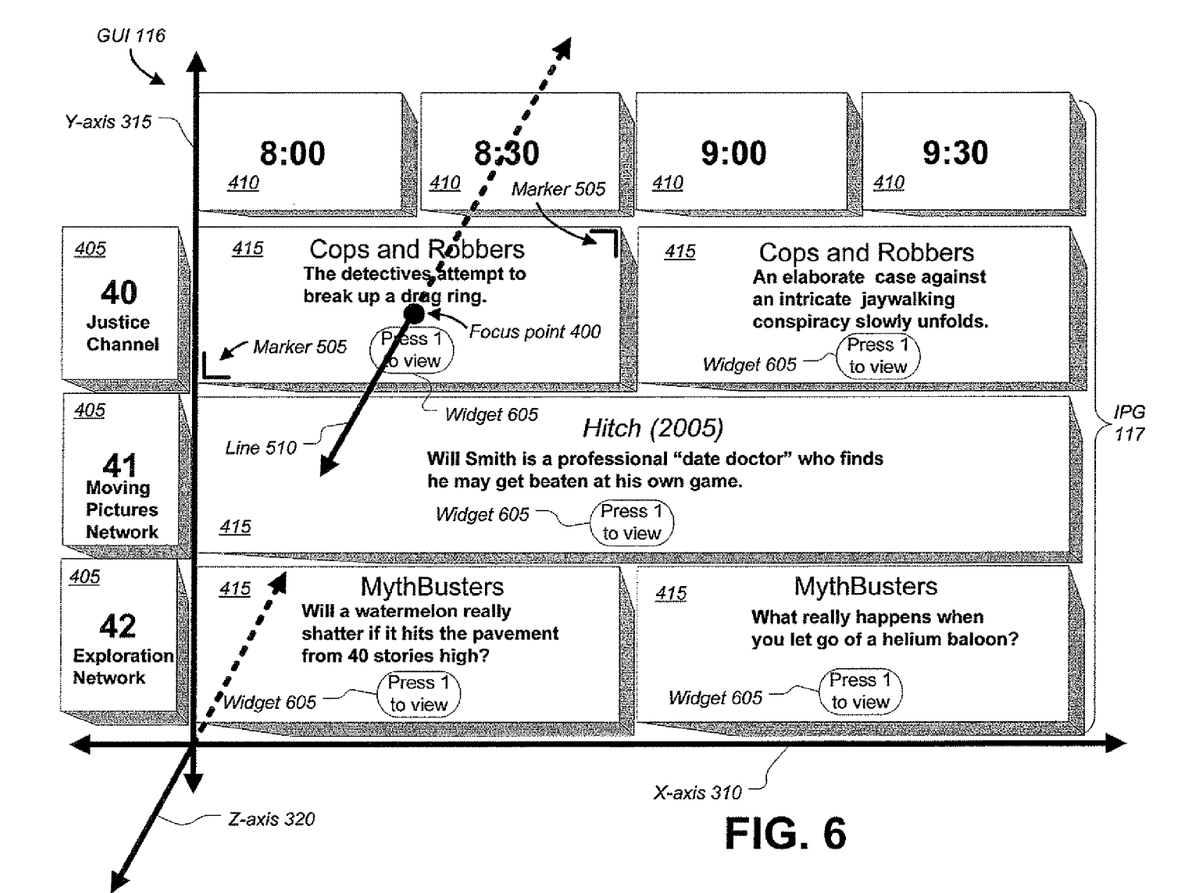
FIG. 6 illustrates an exemplary graphical user interface including an exemplary interactive program guide that may be scrolled in three dimensions, the exemplary graphical user interface illustrated in FIG. 6 representing the application of a zoom in operation applied to the graphical user interface of FIG. 5.

FIG. 6 illustrates an exemplary GUI 116 including an exemplary IPG 117 that may be scrolled in three dimensions, the exemplary GUI 116 illustrated in FIG. 6 representing the application of a zoom in operation applied to the GUI 116 of FIG. 5. The exemplary GUI 116 illustrated in FIG. 6 may also be taken to represent the application of a zoom out operation applied to the GUI 116 of FIG. 7, discussed below. As can be seen, the program information cells 415 of FIG. 6 include additional detail, not found in the GUI 116 of FIG. 5, concerning programs listed in IPG 117. Further, the program information cells 415 of FIG. 6 include widgets 605 not presented in the GUI 116 of FIG. 5. Thus, as a user is in effect moved closer to a focus point 500, more detail and more information may be presented in GUI 116. Further, additional features, such as features provided via widgets 605, may be presented. A widget 605 may be any kind of known graphical user interface element, such as a button, hyperlink, etc. Widgets 605 may provide a variety of features. For example, the widget 605 shown in FIG. 6, upon selection by a user, e.g., using control 111, provides for display of content described in IPG 117.

Figure 7:
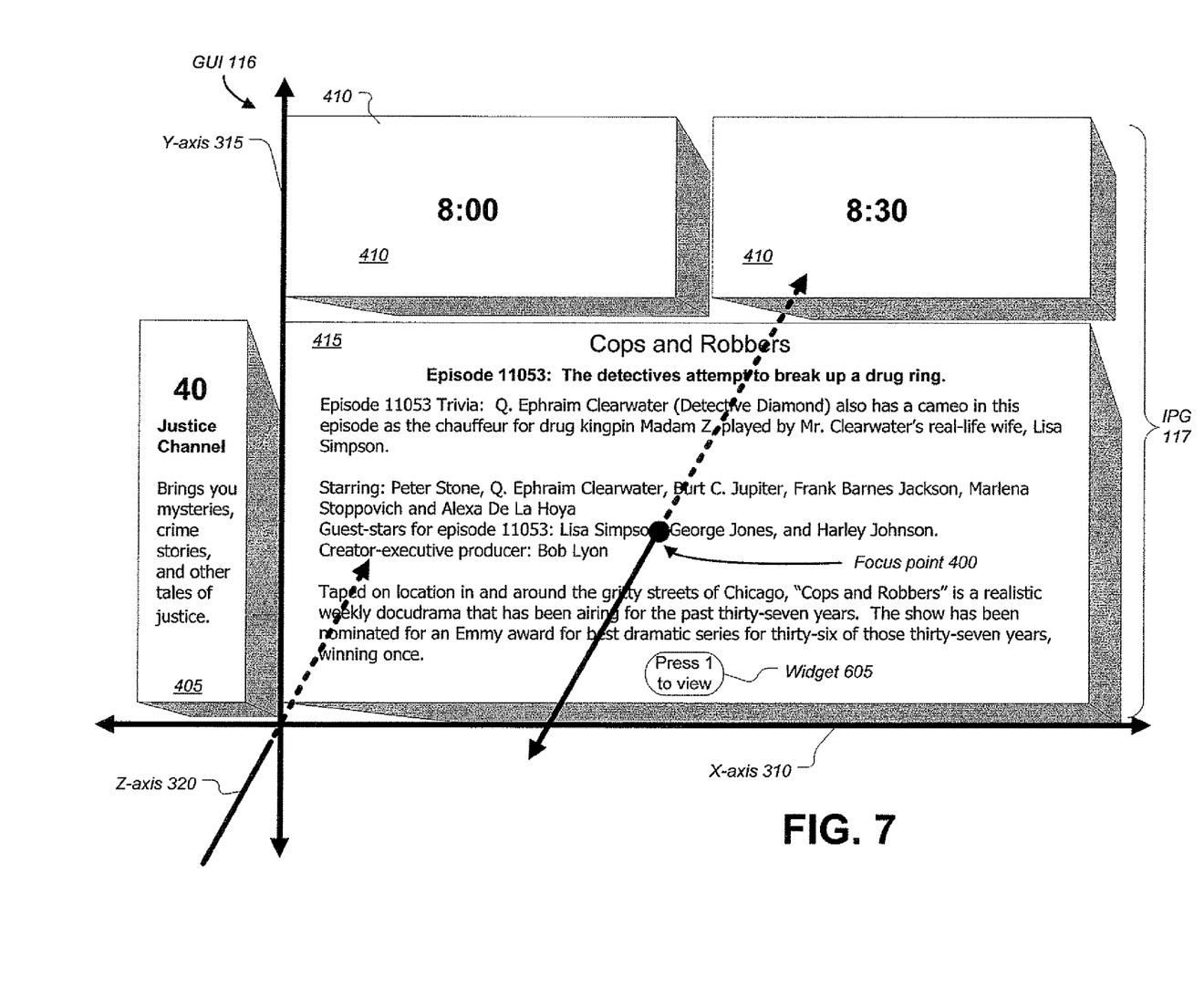
FIG. 7 illustrates an exemplary graphical user interface including an exemplary interactive program guide that may be scrolled in three dimensions, the exemplary graphical user interface illustrated in FIG. 7 representing the application of a zoom in operation applied to the graphical user interface of FIG. 6.

FIG. 7 illustrates an exemplary GUI 116 including an exemplary IPG 117 that may be scrolled in three dimensions, the exemplary GUI 116 illustrated in FIG. 7 representing the application of a zoom in operation applied to the GUI 116 of FIG. 6. As can be seen, the program information cells 415 of FIG. 6 include additional detail, not found in the GUI 116 of FIG. 5, concerning programs listed in IPG 117. Further, the program information cells 415 of FIG. 7 include widgets 605 as discussed above with reference to FIG. 6.

Markers 505 are not shown with respect to the GUI 116 of FIG. 7. This is because no zoom in operation is provided with respect to the GUI 116 of FIG. 7. That is, FIG. 7 illustrates a user's closest possible perspective to focus point 500 in the illustrated exemplary embodiment. Accordingly, a user may utilize control GUI 111 to zoom out from the GUI 116 of FIG. 7, but not to zoom in.

Figure 8:
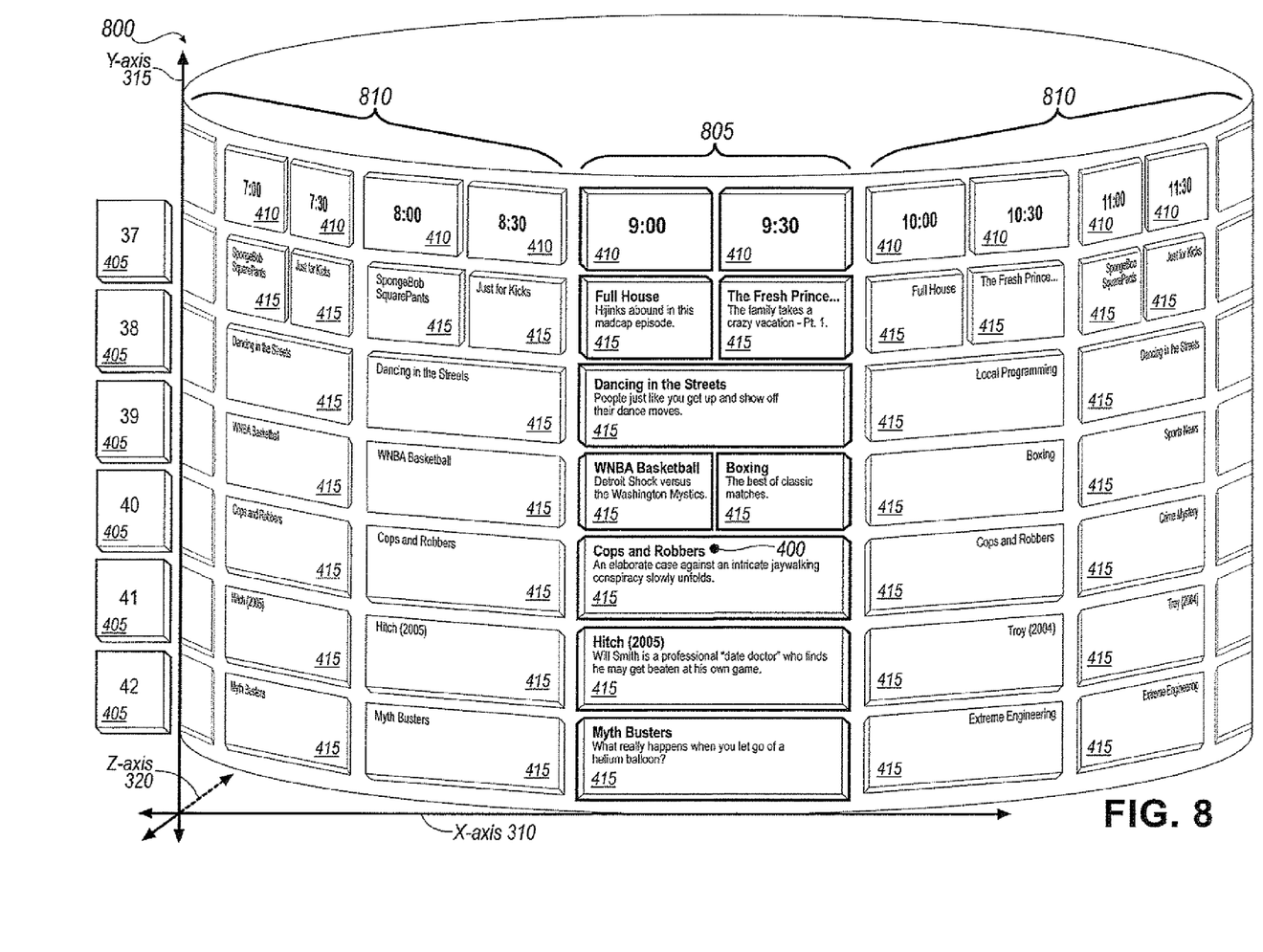
FIG. 8 illustrates an exemplary graphical user interface in which an interactive program guide is presented in a horizontal wheel format.

FIG. 8 illustrates an exemplary GUI 116 in which IPG 117 is presented in what is referred to as a horizontal wheel format. That is, IPG 117 is displayed in a horizontal wheel 800 of program information cells 415. As can be seen in FIG. 8, a foreground column 805 of program information cells 415 includes focus point 500. When IPG 117 is presented in a horizontal wheel format, a column of program information cells 415 including focus point 500 is designated as foreground column 800. Foreground column 805 is rendered by GUI application 105 so that the program information cells 415 in foreground column 805 appear closer to a user than any other program information cells 415 being presented in GUI 116. Background columns 810 in horizontal wheel 800 include any columns of information cells 415 that do not include focus point 500. A column of information cells 415 may be defined in a variety of ways. For example, where IPG 117 provides program listings according to time periods, e.g., one half hour increments, a column of information cells 415 may be defined to include any information cells 415 including program listings within a designated time period.

A user may scroll horizontal wheel 800 to the left or to the right, e.g., utilizing control 111, to select a new foreground column 805, i.e., to move focus point 500 to a new column of information cells 415. Generally, as illustrated in FIG. 8, program information cells 415 included in foreground column 805 display more detail concerning programs listed in IPG 117, while the program information cells 415 in background columns 810 include progressively less detail concerning programs listed in IPG 117 the further such background columns 810 are from foreground column 805. By scrolling horizontal wheel 800, a user may select a column of information cells 415 for which the greatest amount of detail should be displayed.

Figure 9:
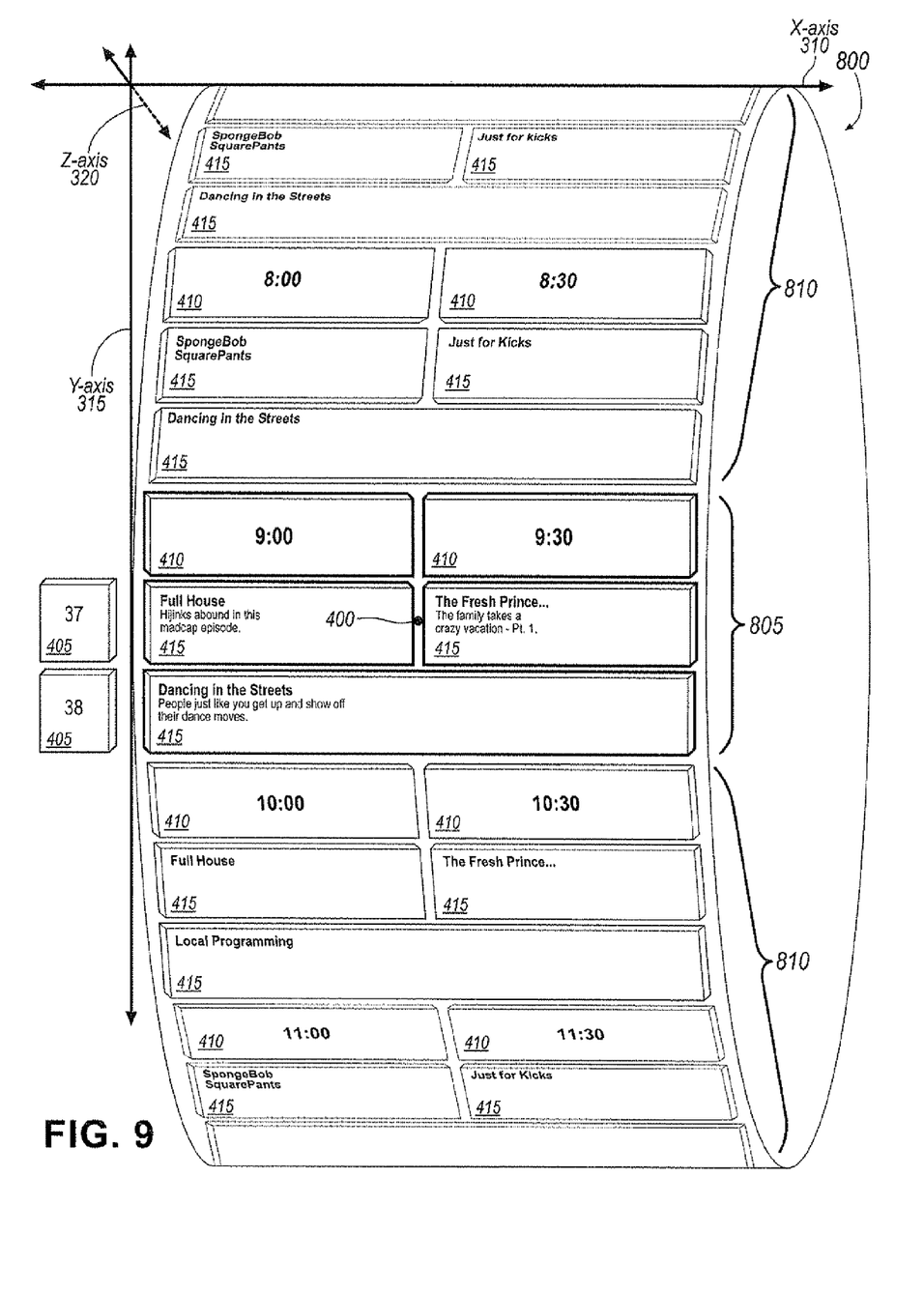
FIG. 9 illustrates an exemplary graphical user interface in which an interactive program guide is presented in a vertical wheel format.

FIG. 9 illustrates an exemplary GUI 116 in which IPG 117 is presented in what is referred to as a vertical wheel format. That is, IPG 117 is displayed in a vertical wheel 900 of program information cells 415. As can be seen in FIG. 8, a foreground row 905 of program information cells 415 includes focus point 500. When IPG 117 is presented in a horizontal wheel format, a row of program information cells 415 including focus point 500 is designated as foreground row 800. Foreground row 905 is rendered by GUI application 105 so that the program information cells 415 in foreground row 905 appear closer to a user than any other program information cells 415 being presented in GUI 116. Background rows 910 in vertical wheel 900 include any rows of information cells 415 that do not include focus point 500. A row of information cells 415 may be defined in a variety of ways. For example, where IPG 117 provides program listings according to program channels, a row of information cells 415 may be defined to include any information cells 415 including program listings for a designated program channel.

A user may scroll vertical wheel 900 to the left or to the right, e.g., utilizing control 111, to select a new foreground row 905, i.e., to move focus point 500 to a new row of information cells 415. Generally, as illustrated in FIG. 8, program information cells 415 included in foreground row 905 display more detail concerning programs listed in IPG 117, while the program information cells 415 in background rows 910 include progressively less detail concerning programs listed in IPG 117 the further such background rows 910 are from foreground row 905. By scrolling vertical wheel 900, a user may select a row of information cells 415 for which the greatest amount of detail should be displayed.

Figure 10:
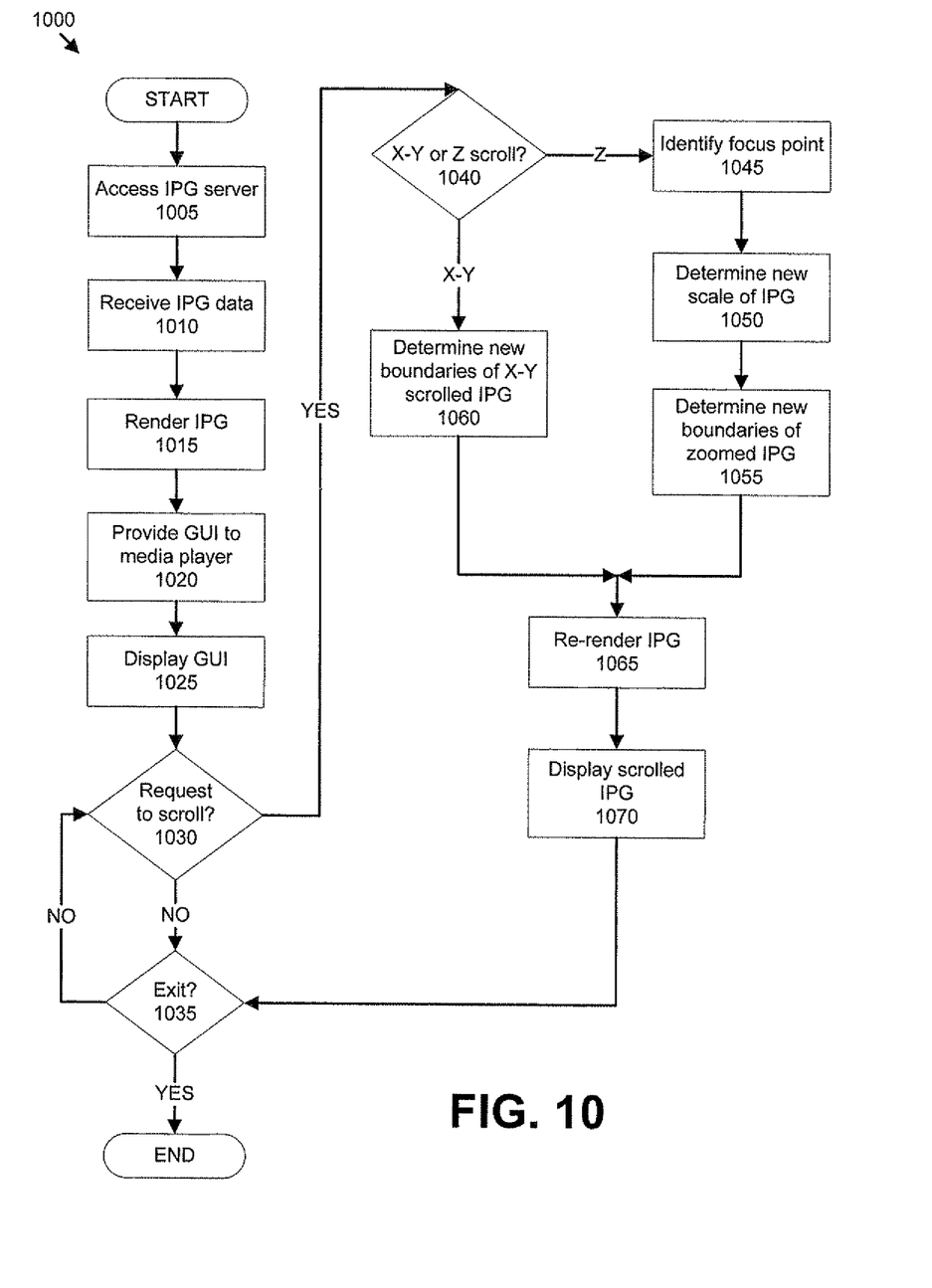
FIG. 10 illustrates an exemplary process for performing a scroll operation including possibly a zoom in or zoom out operation with respect to an exemplary graphical user interface.

FIG. 10 illustrates an exemplary process 1000 for performing a scroll operation including possibly a zoom in or zoom out operation with respect to an exemplary graphical user interface.

In step 1005, a user accesses IPG 117, e.g., by making a selection with control 111 in communication with content processing device 110. IPG 117 may be accessed by a user in a variety of known ways.

Next, in step 1010, content processing device 110 receives data for IPG 117 from IPG server 130. Such data may be received in a variety of known ways, e.g., formatted according to extensible markup language (XML). It is to be understood that content processing device 110 may receive data for IPG 117 upon instantiation of certain program instructions, e.g., GUI application 105, when it is powered on and put it up. That is, step 1010 may not be dependent upon execution of step 1005.

Next, in step 1015, GUI application 105 renders GUI 116 including at least some of the data for IPG 117 received in step 1010, By default, IPG 117 is generally rendered in GUI 116 at a predetermined level of detail, e.g., as depicted in FIG. 5. Further, IPG 117 by default is generally rendered in GUI 116 with focus point 500 included in a program information cell 415 associated with a time period in which the present time falls. Further, IPG 117 by default may be rendered to include channel cells 405 associated with a predetermined set of programming channels, e.g., programming channels listed in a numerical order and occurring first in the list of programming channels included in IPG 117.

Next, in step 1020, GUI application 105 provides GUI 116 to media player 115.

Next, in step 1025, media player 115 displace GUI 116, thereby allowing a user to access IPG 117 within GUI 116.

Next, in step 1030, GUI application 105 determines whether a user request to scroll IPG 117 within GUI 116 has been received. As discussed above, a user may make such a request in a variety of ways, e.g., by utilizing control 111. If such a request to scroll IPG 117 has been received, step 1040 is executed next. Otherwise, step 1035 is executed next.

In step 1035, GUI application 105 determines whether a user request to exit IPG 117 has been received. For example, as discussed above, a widget 605 may allow a user to select an option to view programming listed in IPG 117, selection of such an option effectively including a request to exit IPG 117. If a user request to exit IPG 117 has been received, then process 1000 ends. Otherwise, process 1000 returns to step 1030.

In step 1040, GUI application 105 determines whether the user request to scroll received in step 1030 was a request to scroll within the plane defined by x-axis 305 and y-axis 310, or whether the request to scroll was a request to scroll along the z-axis 315, i.e., was a request to zoom in or out. This determination may be made, for example, according to particular inputs, e.g., keys selected, received from control 111. If a user has requested to scroll within the plane defined by x-axis 305 and y-axis 310, then step 1060 is executed next. However, if a user has requested to zoom in or out, then step 1045 is executed next.

In step 1045, GUI application 105 determines a location of focus point 500 within GUI 116. Focus point 500 may be stored or maintained by GUI application 105 in memory of content processing device 110 as an abstract data point, e.g., as a set of coordinates with respect to axes 305, 310, and 315. Accordingly, in this step, GUI application 105 may retrieve a set of coordinates identifying focus point 500.

Next, in step 1050, GUI application 105 determines a new scale for the display of IPG 117 within GUI 116. That is, when a user selects a zoom in or zoom out operation, i.e., a scroll operation in a direction indicated by z-axis 315, elements of IPG 117, e.g., program information cells 405, must be rendered according to larger or smaller dimensions. Generally program instructions included within GUI application 105 specify the change in scale to the display of IPG 117 that is to be effected upon a zoom in or zoom out operation. However, it is also possible that the change in scale of IPG 117 upon a zoom in or zoom out operation may be a configurable parameter. For example, GUI application 105 may accept input from a user specifying the amount that the scale of the display of IPG 117 should be changed upon a zoom in or zoom out operation. A change in scale may be specified as a percentage change in size, as a change in a number of pixels included in very as dimensions of elements such as program information cells 405, etc. Further, a change in scale may be specified according to instructions in GUI application 105 that specify a range of possible sizes or scales for elements such as program information cells 405 that may be displayed upon a zoom in or zoom out operation.

Next, in step 1055, GUI application 105 determines boundaries for the display of IPG 117 within GUI 116. That is, GUI application 105 determines what elements in IPG 117, e.g., program information cells 405, etc., are to be displayed within GUI 116 following the request of zoom operation. Further in this step, GUI application 105 determines dimensions for such elements in IPG 117.

In step 1060, which may follow the request for an X-Y scroll operation in step 1040, GUI application 105 determines new boundaries for the display of IPG 117 within GUI 116. That is, upon a user request to scroll to the left or to the right, or up or down, GUI application 105 causes IPG 117 to be scrolled a predetermined distance within GUI 116.

In step 1065, which may follow either step 1055 or step 1060, GUI application 105 re-renders a scrolled IPG 117 in interface 116.

Next, in step 1070, GUI application 105 provides GUI 116 to media player 115, thereby causing the scrolled IPG 117 to be displayed in media player 115.

Following step 1070, step 1035 is executed.

Figure 11:
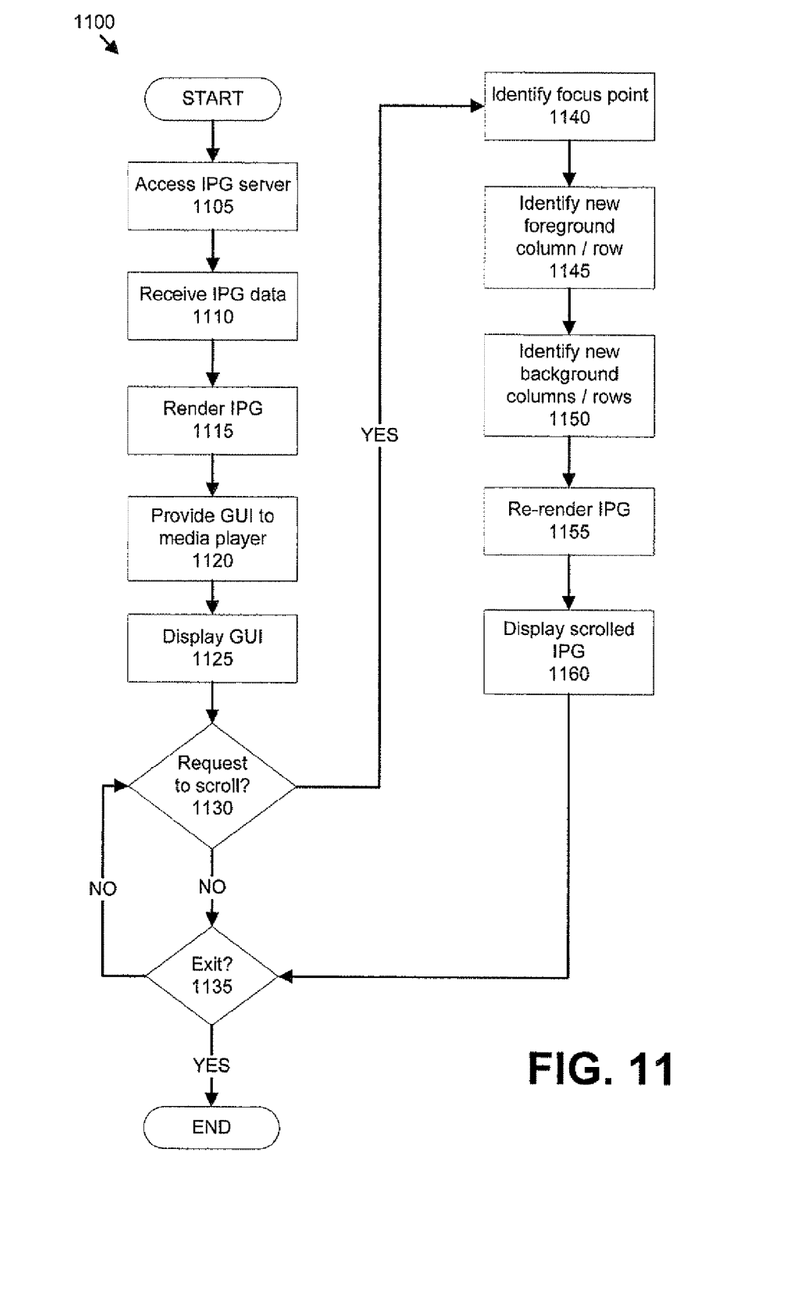
FIG. 11 illustrates an exemplary process for performing a scroll operation on a graphical user interface including a horizontal wheel or a vertical wheel.

FIG. 11 illustrates an exemplary process 1100 for performing a scroll operation on a GUI 116 including a vertical wheel 800 or a horizontal wheel 900 for display of IPG 117.

Steps 1105 through 1135 are substantially similar to steps 1005 through 1035 described above with respect to process 1000. If a request for a scroll operation is received in step 1130, then step 1140 is executed.

In step 1140, GUI application 105 determines the location of focus point 500, which in the context of a vertical wheel left on 800 or a horizontal wheel 900 means determining a foreground column 805 or foreground row 905 that includes the focus point 500.

Next, in step 1145, GUI application 105 identifies a column or row as appropriate that will become the new foreground column 805 or foreground row 905 displayed in GUI 116 following the scroll operation requested in step 1130. That is, a user may have requested to scroll left or right, i.e., along x-axis 305, or up or down, i.e., a long y-axis 310. Accordingly, GUI application 105 may identify the appropriate background column 810 or background row 910 adjacent to a present foreground column 805 or foreground row 905.

Next, in step 1150, GUI application 105 identifies background columns 810 or background rows 910 to be displayed in GUI 116 following the request and scroll operation. Program instructions in GUI application 105 generally include a predetermined number of background columns 810 or background rows 910 to be displayed in GUI 116, although this number may be a configurable parameter, e.g., determined according to user input.

Next, in step 1155, GUI application 105 re-renders a scrolled IPG 117 in interface 116.

Next, in step 1160, GUI application 105 provides GUI 116 to media player 115, thereby causing the scrolled IPG 117 to be displayed in media player 115.

Following step 1165, step 1135 is executed.

CONCLUSION

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites explicitly to the contrary.

What is claimed is:

1. A method, comprising:
   receiving, by a content processing device, interactive program guide data;
   generating, by the content processing device, a number of cells to be included in an interactive program guide based at least in part on the interactive program guide data;
   positioning, by the content processing device, each of the cells in a plane defined by an x-axis and a y-axis within a graphical user interface;
   positioning, by the content processing device, a focus point and a plurality of markers within the graphical user interface in response to a selection by a user of one or more arrow keys included in a plurality of arrow keys that are a part of a remote control and that are configured to allow navigation within the plane defined by the x-axis and the y-axis, wherein the plurality of markers identify a portion of the graphical user interface that is scrollable along a z-axis;
   receiving, by the content processing device, a request to scroll in the graphical user interface along the z-axis, the z-axis being perpendicular to the plane defined by the x-axis and the y-axis and that intersects the focus point, the request to scroll initiated by a selection by the user of a key that is a part of the remote control and not included in the plurality of arrow keys; and performing, by the content processing device within the portion of the graphical user interface identified by the plurality of markers and in response to the request to scroll along the z-axis, one of a zoom in operation resulting in fewer cells than the number of cells and additional information being displayed within the graphical user interface and a zoom out operation resulting in more cells than the number of cells being displayed within the graphical user interface.

2. The method of claim 1, further comprising providing, by the content processing device, the graphical user interface for display by a media player.

3. The method of claim 1, further comprising:
receiving, by the content processing device, a request to scroll along the x-axis or the y-axis in the graphical user interface; and
scrolling, by the content processing device, along the x-axis or the y-axis in response to the request to scroll along the x-axis or the y-axis.

4. The method of claim 1, wherein a level of detail of information included in at least one of the cells is decreased upon performance of the zoom out operation.

5. The method of claim 1, further comprising:
organizing, by the content processing device, the cells into a set of columns; and
identifying, by the content processing device, a foreground column within the set of columns and a set of background columns within the set of columns, wherein all of the cells in the foreground column are associated with a coordinate on the z-axis that is closer to a user than any z-axis coordinates of any cells in the background columns.

6. The method of claim 1, further comprising:
organizing, by the content processing device, the cells into a set of rows; and
identifying, by the content processing device, a foreground row within the set of rows and a set of background rows within the set of rows, wherein all of the cells in the foreground row are associated with a coordinate on the z-axis that is closer to a user than any z-axis coordinates of any cells in the background columns.

7. The method of claim 1, tangibly embodied as computer-executable instructions on at least one non-transitory computer-readable medium.

8. A system, comprising:
a content processing device that
receives interactive program guide data from an interactive program guide server;
generates a number of cells to be included in an interactive program guide based at least in part on the interactive program guide data;
positions each of the cells in a plane defined by an x-axis and a y-axis within a graphical user interface;
positions a focus point and a plurality of markers within the graphical user interface in response to a selection by a user of one or more arrow keys included in a plurality of arrow keys that are a part of a remote control and that are configured to allow navigation within the plane defined by the x-axis and the y-axis, wherein the plurality of markers identify a portion of the graphical user interface that is scrollable along a z-axis;

receives a request to scroll in the graphical user interface along the z-axis, the z-axis being perpendicular to the plane defined by the x-axis and the y-axis and that intersects the focus point, the request to scroll initiated by a selection by the user of a key that is a part of the remote control and not included in the plurality of arrow keys; and performs, within the portion of the graphical user interface identified by the plurality of markers and in response to the request to scroll along the z-axis, one of a zoom in operation resulting in fewer cells than the number of cells and additional information being displayed within the graphical user interface and a zoom out operation resulting in more cells than the number of cells being displayed within the graphical user interface.

9. The system of claim 8, wherein the content processing device is further configured to provide the graphical user interface for display by a media player.

10. The system of claim 8, wherein the content processing device is further configured to:
receive a request to scroll along the x-axis or the y-axis in the graphical user interface; and
scroll along the x-axis or the y-axis in response to the request to scroll along the x-axis or the y-axis.

11. The system of claim 8, wherein a level of detail of information included in at least one of the cells is decreased upon performance of the zoom out operation.

12. The system of claim 8, wherein the content processing device is further configured to:
organize the cells into a set of columns; and
identify a foreground column within the set of columns and a set of background columns within the set of columns, wherein all of the cells in the foreground column are associated with a coordinate on the z-axis that is closer to a user than any z-axis coordinates of any cells in the background columns.

13. The system of claim 8, wherein the content processing device is further configured to
organize the cells into a set of rows; and
identify a foreground row within the set of rows and a set of background rows within the set of rows, wherein all of the cells in the foreground row are associated with a coordinate on the z-axis that is closer to a user than any z-axis coordinates of any cells in the background columns.

14. A method, comprising:
receiving, by a content processing device, interactive program guide data;
generating, by the content processing device, a number of cells to be included in an interactive program guide based at least in part on the interactive program guide data;
positioning, by the content processing device, each of the cells in a plane defined by an x-axis and a y-axis within a graphical user interface;
positioning, by the content processing device, a focus point and a plurality of markers within the graphical user interface in response to a selection by a user of one or more arrow keys included in a plurality of arrow keys that are a part of a remote control and that are configured to allow navigation within the plane defined by the x-axis and the y-axis, wherein the plurality of markers identify a portion of the graphical user interface that is scrollable along a z-axis;
receiving, by the content processing device, a request to zoom in in the graphical user interface along the z-axis, the z-axis being perpendicular to the plane defined by the x-axis and the y-axis and that intersects the focus point, the request to zoom in initiated by a selection by the user of a key that is a part of the remote control and not included in the plurality of arrow keys;

reducing, by the content processing device within the portion of the graphical user interface identified by the plurality of markers and in response to the request to zoom in along the z-axis, the number of cells displayed in the graphical user interface; and displaying, by the content processing device in response to the request to zoom in along the z-axis, additional information in at least one cell displayed in the graphical user interface.

15. The method of claim 14, further comprising providing, by the content processing device, markers that indicate an area of the graphical user interface with respect to which the zooming in is performed.

16. The method of claim 14, tangibly embodied as computer-executable instructions on at least one non-transitory computer-readable medium.

17. The method of claim 1, wherein the additional information includes at least one widget, the at least one widget comprising at least one of a button and a hyperlink.

18. The system of claim 8, wherein the additional information includes at least one widget, the at least one widget comprising at least one of a button and a hyperlink.

* * * * *